(12) United States Patent
Jordan

(10) Patent No.: US 8,035,032 B2
(45) Date of Patent: Oct. 11, 2011

(54) ARRANGEMENT FOR ESTABLISHING A CONNECTION BETWEEN TWO CABLE SUPPORT DEVICE ELEMENTS AND CONNECTION ELEMENTS

(75) Inventor: Ernst-Günther Jordan, Menden (DE)

(73) Assignee: Obo Bettermann GmbH & Co. KG, Mender (DE)

( * ) Notice: Subject to any disclaimer, the term of this patent is extended or adjusted under 35 U.S.C. 154(b) by 748 days.

(21) Appl. No.: 11/993,826

(22) PCT Filed: May 31, 2006

(86) PCT No.: PCT/EP2006/062801
§ 371 (c)(1),
(2), (4) Date: Jul. 23, 2008

(87) PCT Pub. No.: WO2007/000384
PCT Pub. Date: Jan. 4, 2007

(65) Prior Publication Data
US 2009/0159312 A1    Jun. 25, 2009

(30) Foreign Application Priority Data
Jun. 28, 2005    (DE) ............... 20 2005 010 108 U

(51) Int. Cl.
*H01B 7/00* (2006.01)
(52) U.S. Cl. ............... 174/135; 174/68.3; 174/99 R; 385/137
(58) Field of Classification Search ............... 174/135, 174/68.3, 73.1, 99 R; 385/137
See application file for complete search history.

(56) References Cited

U.S. PATENT DOCUMENTS

| 7,232,952 B2 * | 6/2007 | Lin et al. | 174/72 A |
| 7,622,682 B2 * | 11/2009 | Malin | 174/135 |
| 7,787,739 B2 * | 8/2010 | Munn | 385/137 |
| 7,902,462 B2 * | 3/2011 | Brown et al. | 174/135 |

FOREIGN PATENT DOCUMENTS

| DE | 19841643 | 3/2000 |
| DE | 20205094 | 9/2003 |
| EP | 0645862 | 3/1995 |
| FR | 2408748 | 6/1979 |
| WO | 92/04755 | 3/1992 |

* cited by examiner

*Primary Examiner* — Dhirubhai R Patel
(74) *Attorney, Agent, or Firm* — Margaret Polson; Oppedahl Patent Law Firm LLC

(57) ABSTRACT

A cable support system uses at least one connection element to hold together two cable support device elements at an overlapping connection section. Each cable support device element has at least one contact face within its connection section. The contact faces of the cable support device elements are in contact. The connection element includes a press-on section and latching arms on opposite sides of the press-on section. Each latching arm includes a connection limb and a hook element on the free end of the connection limb. At least one of the latching arms has spring-elastic material properties. In use, the connection limbs extend through the contact faces. The connection element is held under spring prestress with its press-on section on the surface of one cable support device element's connection section and its hook elements on the opposite surface of the second cable support device element's connection section.

17 Claims, 3 Drawing Sheets

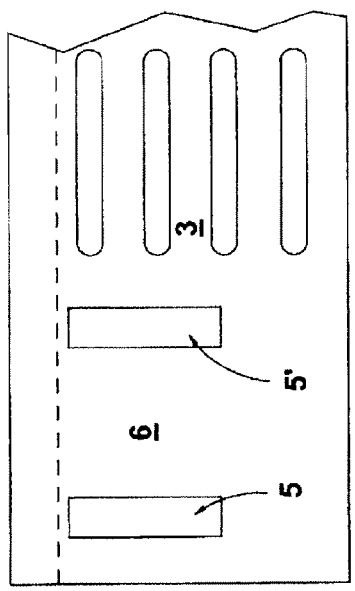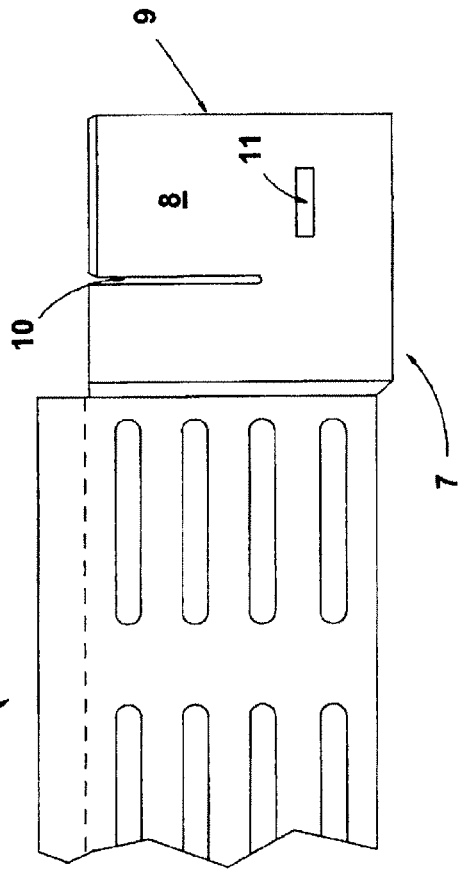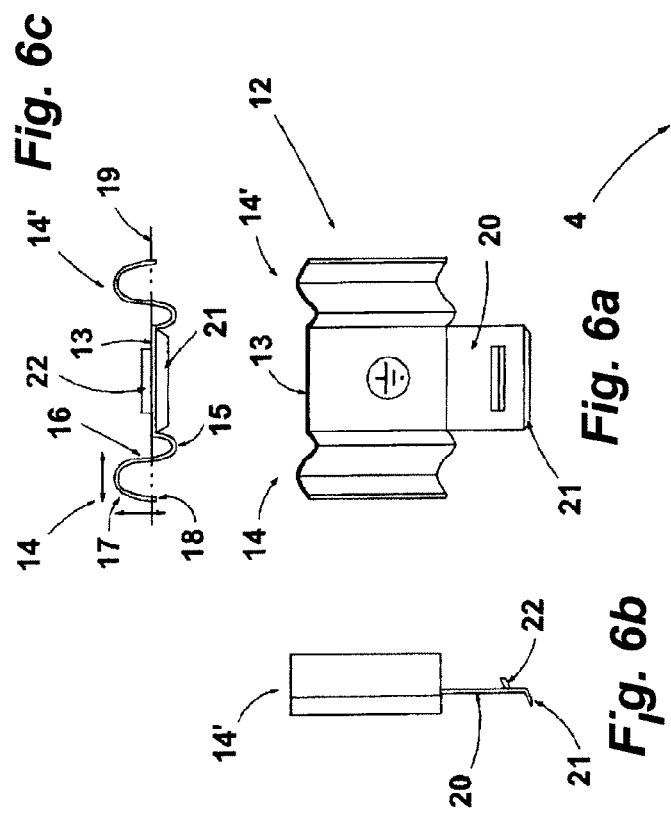

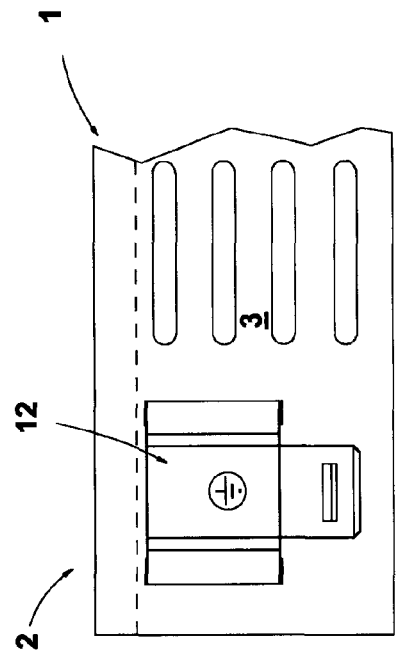
*Fig. 2*
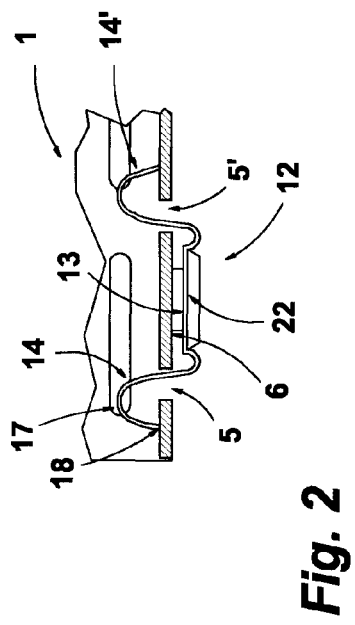
*Fig. 4*
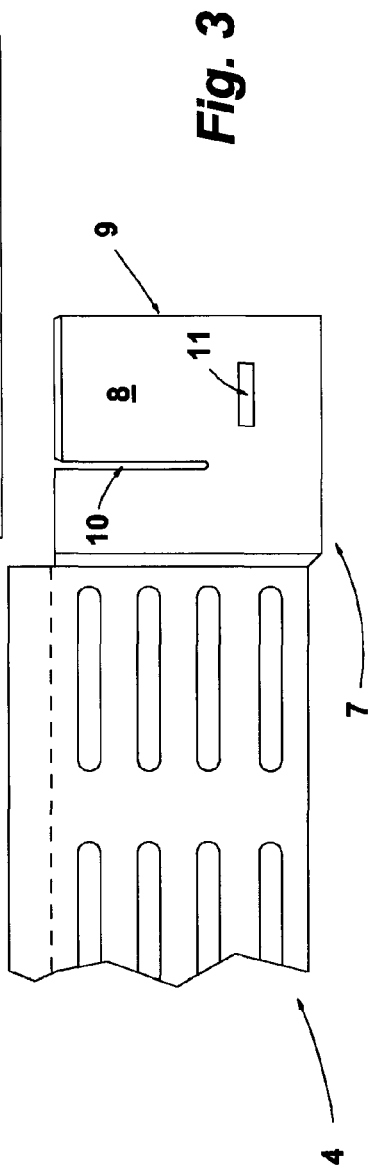
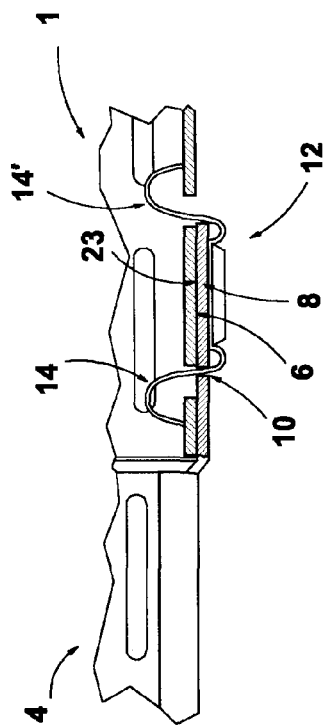
*Fig. 3*

ARRANGEMENT FOR ESTABLISHING A CONNECTION BETWEEN TWO CABLE SUPPORT DEVICE ELEMENTS AND CONNECTION ELEMENTS

CROSS REFERENCE APPLICATIONS

This application is a national stage application of PCT application no. PCT/EP2006/062801 filed on May 31, 2006 and claiming priority from German application 202005010108.7 filed on Jun. 28, 2005.

BACKGROUND

The invention relates to establishing a connection between two cable support device elements with overlapping connection sections for the formation of a cable support system with at least one connecting element attaching the two cable support device elements together. The invention further relates to a connecting element for establishing a mechanical connection between two cable support device elements disposed with overlapping connection sections for the formation of a cable support system.

Cable support device elements include cable ducting, cable channels, cable conduits or the like where several individual elements are combined to form a cable support or cable guidance system. A cable support system formed by combining several cable support device elements without tools and bolts is disclosed in DE 198 41 643 A1. These known cable support device elements have a connection section at both ends with complementary mechanical connection members. The connection section of these known cable support device elements is formed by crimping the lateral cross-pieces, slightly enlarging the interior space, as well as of the bottom unit, while the other connection section is not crimped. Mechanical connecting members serve as snaps and latch recesses, on the one hand, and snaps and latches as complementary members, on the other hand. This known cable support device element is made from sheet metal with the snap and latch recesses as punch-outs and the snap and latch are outformings, reshaped notchings, clips or the like.

The prior art individual cable support device elements can be connected to one another without tools. However the development of the necessary connection members, such as outformings, notchings and the like, require significant technical expenditures. Additionally, for the intended connection of two cable support device elements, a certain material elasticity is assumed. However, not every cable support device element has a sufficient degree of material elasticity.

Bolts are also applied as connection elements to connect two cable support device elements with one another. This type of cable support device elements does not need any further connection members to be attached together, with the exception of the necessary breakthroughs for inserting the bolts. Such cable support device elements are therefore less expensive to produce. However, the connection of two cable support device elements of this type requires tools.

Cable support systems serve primarily for supporting cables. Cable support systems installed in buildings often have requirements beyond a pure support function. The individual cable support device elements of a metal cable support system often must be permanently connected in an electrically conducting manner with an equipotential bond. To ensure the intended electrical contacts in known cable support device elements, the adjoining cable support device elements are connected with bolts. While this is possible, it has the disadvantage that the meaning and purpose of bolt-less cable support systems, such as disclosed in DE 198 41 643 A1, are lost. In this known prior art, two sheet metal cable support device elements that are connected together have overlapping connection sections. However, electric contacts are left to chance due to the necessary tolerances for realizing the snap and latch connections. Therefore, bolts are additionally employed to bolt-connect the lateral cross-pieces in the region of the overlapping connection sections or with an additional bottom connector bolt-connected to the two adjoining bottoms.

These additional bolt connection of two cable support device elements is particularly necessary when the cable support system formed of several cable support device elements has a grounding conductor function for diverting short circuit currents. In this case, the adjoining cable support device elements must be connected together with the necessary contact area to be electrically conducting to allow the transmission of the short circuit current.

Even if the known cable support device element that can be connected tool-free and bolt-free establish a connection between two cable support device elements that may be sufficient for equipotential bonding, these known elements have the disadvantage that additional mounting steps must be carried out to establish the necessary electrical connection for the diversion of a short circuit of two adjoining cable support device elements. In particular, these additional steps are ones in which tools are required such as for tightening bolts.

The foregoing example of the related art and limitations related therewith are intended to be illustrative and not exclusive. Other limitations of the related art will become apparent to those of skill in the art upon a reading of the specification and a study of the drawings.

Building on this discussed prior art, the invention addresses the problem of providing an arrangement with which the tool-free connection of two cable support device elements is possible without this connecting having a disadvantageous effect on the production process for the production of the individual cable support device elements, and with which a permanent electrical connection, corresponding to the requirements, of two cable support device elements is also possible.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements. This problem is solved according to the invention through an arrangement described in the introduction, in which each cable support device element within its connection section(s) comprises at least one contact face on which, after the cable support device elements are connected, a contact face of the other cable support device element is in contact and each contact face is delimited on two sides by the particular breakthroughs extending through the particular connection section bearing the contact face and/or an edge of the connection section, the connection element comprises a press-on section and two latching arms disposed on different sides with respect to the press-on section each with connection limbs extending in a transverse direction with respect to the extent of the press-on section and with a hook element disposed at the free end of the connection limb, which latching arms with their connection limbs are disposed for the extension through or girding of the connection section bearing a contact face and of which latching arms at least one has at least sectionally spring-elastic material properties, and the connection element mounted for retaining together the two cable support device elements under spring loading is stayed with its press-on section on the surface of the connection section of the one cable support device element and with its hook elements on the opposite surface of the connection section of the other cable support device element.

This problem is further solved through a connection element of the type described in the introduction, in which the connection element comprises a press-on section and two latching arms disposed on different sides with respect to the press-on section with connection limbs each extending in a transverse direction to the extent of the press-on section and with a hook element disposed at the free end of the connection limb. The latching arms are disposed with their connection limbs for extending through or girding the connection section bearing a contact face and at least one of the latching arms has at least sectionally spring-elastic material properties.

With this disposition, the cable support device elements can be connected together. The cable support device elements can be developed as cable ducting, cable channels, cable conduits or the like, independently of their particular material condition. The cable support device elements only need a connection section overlapping a connection section of the other cable support device element to connect. Both connection sections only need to have breakthroughs and/or insections as marginally open breakthroughs in order to form a defined contact face. The contact faces of the two cable support device elements to be connected are disposed such that the contact faces of the two connection sections are aligned with respect to one another, preferably in contact on one another. Such development of the connection section is readily possible independent of the material utilized for the construction of a cable support device element and also independent of its thickness.

The actual mechanical connection between the two cable support device elements takes place by utilizing a connection element with the two adjacently disposed contact faces of the overlapping connection section fixed with respect to one another and the contact faces pressed against one another with a defined press-on pressure. The connection element comprises a press-on section and two latching arms disposed on different sides of the press-on section for the mechanical fixing of the two cable support device elements with respect to one another. The latching arms extend with their connection limb through adjoining connection sections of the two cable support device elements and function as latches to form-fittingly connect the two connection sections with one another. The dimensioning of the latching arms of the connection elements and the breakthroughs or insections of the connection sections of the cable support device elements are usefully matched to one another. This means that the distance that the two breakthroughs are spaced apart from one another corresponds to the height of the connection limbs of the connection element, or is minimally greater than the height of the connection limbs. This allows for the connection limbs to be readily guided through the breakthroughs. The connection element is fixed with little or no play on that connection section with the breakthroughs spaced apart with respect to one another at the level of the connection limb. The inner clearance of the breakthroughs corresponds to the distance of the connection limbs of the latching arms in such manner that the mounted connection element is also held free of play in the transverse direction with respect to the height of the connection limbs and any resilience is caused by the material elasticity of the connection limbs.

The latching arms of a connection element have a hook element at their free end which extends behind the breakthrough of a connection section. On the one top side of the connection section the press-on section is in contact. On the opposing top side of the breakthrough of the other connection section is stayed the connection element with its hook elements. The latching arms are provided in such form that the mounted connection element is held under a certain spring prestress with its press-on section on the one top side of a connection section. At least one of the two latching arms, usefully both, comprise spring-elastic material properties to allow the prestress. According to a preferred embodiment example the entire connection element is produced of a sheet of spring steel.

With such a connection element, two overlapped connection sections of two cable support device elements can be mechanically connected with one another in a simple, tool free manner. According to an embodiment example, both connection sections have breakthroughs aligned with one another for delimiting the particular contact faces when overlapped properly, and the latching arms of the connection element associated with a contact face are guided through the breakthroughs until the hook elements become stayed on the surface of the opposing connection section.

The contact faces of the overlapping connection sections of the two cable support device elements are in contact with one another under defined press-on force due to the defined prestress applied by the latching arms, which is desirable for developing an electrical connection of the two cable support device elements. Through the connection element a precise mechanical and defined electrical connection of two cable support device elements takes place. The spacing of the breakthroughs for guiding through the latching arms defines inter alia the size of the contact face with which the two connection sections are in contact. Utilizing a connection element with at least two latching arms spaced apart from one another around a contact face, makes feasible the formation of the connection element in such manner that the two contact faces to be connected with one another can be retained in contact with an already acting press-on force.

The connection sections of the two cable support device elements are usefully located in the side walls. Each of these includes one or more contact faces, depending on the height of the side walls. A corresponding number of connection elements are utilized to establish the desired connection.

In a preferred embodiment, each cable support device includes at its end one complementarily formed connection section.

The connection elements required for the establishment of a mechanical connection with a further cable support device element are usefully pre-mounted on the first connection section. Specifically on the connection section with contact faces formed by two breakthroughs spaced apart from one another. To connect the connection section with pre-mounted connection elements, the contact face of the complementary connection section of the other cable support device element has insections as marginally open breakthroughs, such that a connector tongue is developed as a blade terminal element. This can be formed by two insections spaced apart from one another or through an insection and an edge of the connection section. To establish the desired connection, the connector tongue is slid under the press-on section of the connection element mounted on the other connection section. It is useful if the connection elements comprise an outwardly projecting run-up ramp directed toward the connector tongue to be slid in to facilitate this mounting. This ramp is preferably located at the free end of an additional latching extension on each connection element. This additional latching extension can have an inwardly projecting locking latch which engages a locking latch recess of the connection section after the two cable support device elements are assembled as intended. Both cable support device elements are subsequently also latched in the joining direction through the locking latch engaging into the locking latch recess. The run-up ramp can be utilized for detaching such a connection by sliding in a tool, for example a screw driver, with which the locking latch can be lifted out of the locking latch recess.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 1 is a top view of an arrangement for establishing a mechanical connection between two cable support device elements.

FIG. 2 a schematic longitudinal section through one of the two cable support device elements with a pre-mounted connection element, FIG. 3 is a side view of the arrangement of FIG. 1 when assembling the two cable support device elements, FIG. 4 is a partial longitudinal section of the two cable support device elements connected together

FIGS. 6a-c are a top, side and perspective view of a connection element.

Figure 5:
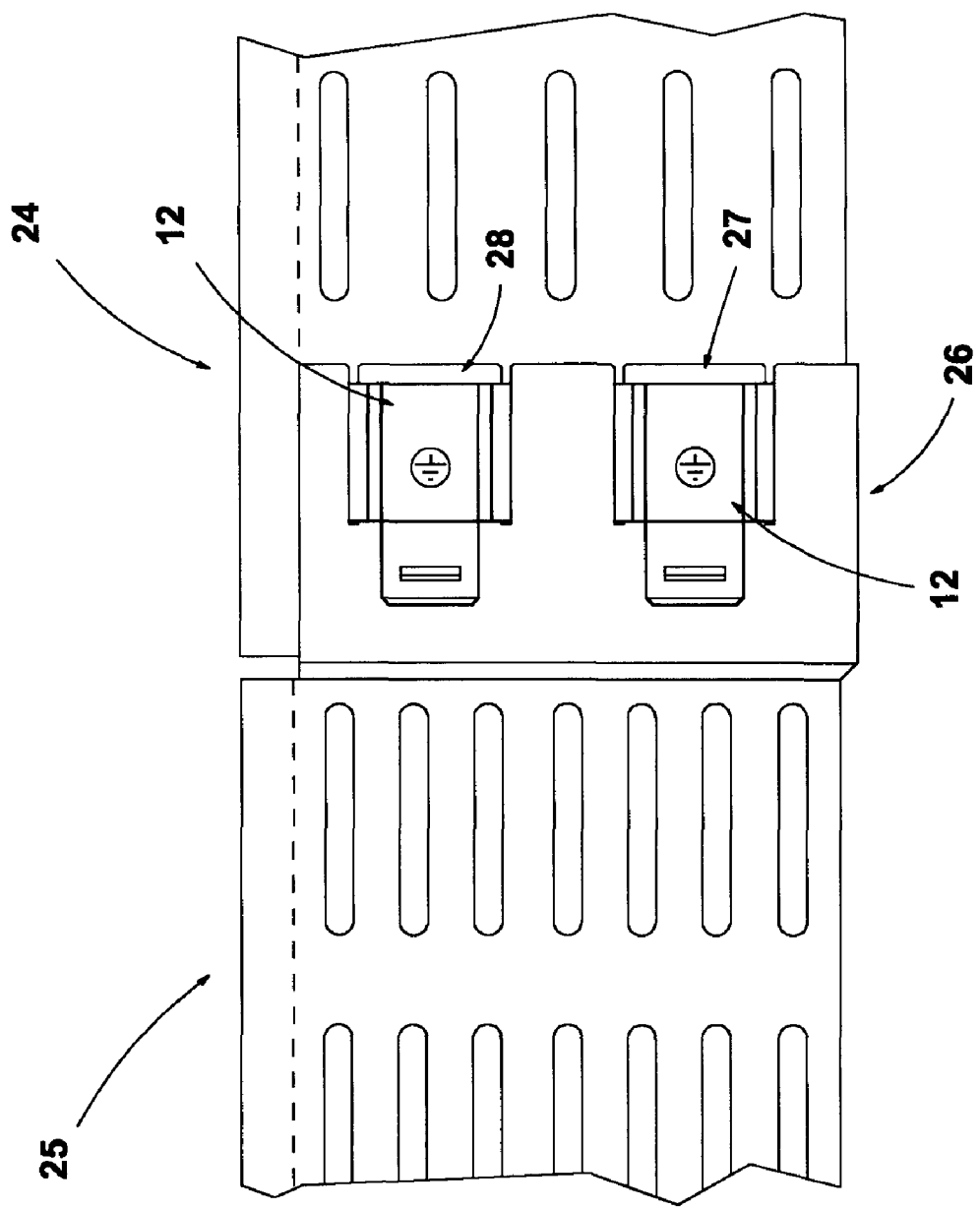
FIG. 5 is a schematic side view of two cable ducts connected with one another according to a further embodiment example.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

A cable duct 1 as a first cable support device element has at one end a connection section 2, to the left in FIG. 1. FIG. 1 has the cable duct 1 in a side view and, thus, shows the one side wall 3 of the cable duct 1. The connection section 2 forms the end section of the cable duct 1 and serves for connecting the cable duct 1 with a further cable duct 4 formed as a second cable support device element. Connection section 2 of the cable duct 1 has two elongated vertical breakthroughs 5, 5' spaced apart from one another. The breakthroughs 5, 5' are circumferentially closed and laterally border a contact face 6, formed of wall segment 6 located between the two breakthroughs 5, 5'. The two cable ducts 1, 4 include at each of their two ends identical connection sections for the formation of a cable support system. Therefore the cable duct 1 includes at its other end (not shown) a connection section corresponding with the connection section 7 of the cable duct 4. The cable duct 4 also includes at its end (not shown a connection section which is structured like the connection section 2 of cable duct 1.

The connection section 7 of the cable duct 4 is formed by crimping, which increases the cross sectional area of the cable duct. The connection section 7 is thus formed as a sleeve for receiving the connection section 2 of cable duct 1, such that the two connection sections 2, 7 can be partially overlapped. Connection section 7 has a connector tongue 8 formed by the front edge 9 of the connection section 7 and by an insection 10 terminating at the upper edge of connection section 7. The backside of the connector tongue 8 forms the contact face of the connection section 7. The width of the connector tongue 8 corresponds approximately to the width of the spacing of the breakthroughs 5, 5' of the connection section 2 of cable duct 1. The connector tongue 8 is delimited on the underside by a locking latch reception 11. The cable ducts 1, 4 depicted in the embodiment example are produced of a zinc-plated sheet metal.

Referring next to FIGS. 6a-c, connection elements 12 are used, in addition to the connection sections 2, 7 of the cable ducts 1, 4, to connect the two cable ducts 1, 4 with the desired mechanical. The number of utilized connection elements 12 is dependent on the number of contact faces which a connection section 2, 7 bears. Connection element 12 is depicted in FIG. 6a in a top view, a side view in FIG. 6b and a slightly oblique perspective view in FIG. 6c. The connection element 12 is produced by reshaping a piece of spring steel sheet metal. The connection element 12 includes a press-on section 13, which contacts on the outside of the connector tongue 8 of the cable duct 4. Press-on section 13 has latching arms 14, 14' on opposing sides. The latching arms 14, 14' are structured mirror-symmetrically with respect to one another. The following description of the latching arm 14 applies to the latching arm 14' as well.

The latching arm 14 is structured in the shape of an "S" and comprises a first arc segment 15 extending outwardly from the press-on section 13. Adjoining the arc segment 15 is a connection limb 16, which bears at its free end a hook element 17. The hook element 17 in the depicted embodiment example is also formed as an arc piece so that the latching arm 14 has an overall S-shaped formation. As is evident in the top view of the connection element 12 of FIG. 6c, the free end 18 of hook element 17 is located behind the plane of the backside of the press-on section 13. This virtual plane is denoted in FIG. 6c by the reference number 19. The latching arm 14 is spring-elastic in the direction of plane 19 as well as in the transverse direction due to the material elasticity and the shape.

A latching extension 20 is formed onto the lower end of the press-on section 13. At the lower end of latching extension 20 there is an outwardly projecting run-up ramp 21 and an inwardly projecting locking latch 22 spaced apart from the run-up ramp 21 in the direction of the press-on section 13. As is evident in the side view, FIG. 6b, of the connection element 12, the locking latch 22 is upwardly inclined toward the press-on section 13 such that its underside represents a quasi run-up ramp.

Referring next to FIGS. 3 and 4, the latching arms 14, 14' of the connection element 12 extend through the breakthroughs 5, 5' such that the free ends 18 of the hook elements 17 are held on the backside of the wall 3 of the connection section 2 of the cable duct 1. The insection 10 also serves as a guide for a section of the latching arm 14, namely the connection limb 16, The locking latch reception 11 serves for receiving the locking latch 22.

In use the connection element(s) 12 is(are) pre-mounted on the cable duct 1 before the two cable ducts 1, 4 are connected together. The partial longitudinal section of FIG. 2 shows the connection element 12 pre-mounted on the connection section 2 of the cable duct 1. The connection element 12 is stayed with the free ends 18 of a latching arm 14, 14' on the inside of wall 3 of the connection section 2. The locking latch 22 is in contact on the outside with the contact face 6. In an embodiment example not depicted in the Figures, a recess is located below the contact face 6 of the connection section 2 for receiving the locking latch 22 corresponding to the locking latch reception 11 of the cable duct 4. In such an embodiment the connection element 12 pre-mounted on the cable duct is in planar contact with the press-on section 13 on the contact face.

To connect the two cable ducts 1, 4 the cable duct 1 with its two connection elements 12 pre-mounted on the opposing walls is set with a vertical joining movement into the connection section 7, formed in the manner of a sleeve, of the cable duct 4, indicated by arrow in FIG. 3. During this process the connector tongue 8 is moved between the press-on section 13 of connection element 12 and the contact face 6 of connection section 2 of the cable duct 1. This is readily possible due to the lower run-up ramp 21 of the connection element and the upwardly directed, bent-off disposition of the locking latch 22. As a consequence of the material-elastic formation of latching arms 14, 14', locking latch 22 automatically snaps into the locking latch reception 11 of connection section 7 of cable duct 4 after the two cable ducts 1, 4 have been properly assembled. The bent pitching of the locking latch 22 subsequently acts as a counterhook element such that the disassembly of the two cable ducts 1, 3 is not readily possible.

The two connected cable ducts 1, 4 are depicted in FIG. 4. This illustration makes clear that the press-on section 13 of connection element 12 is in contact over the entire area on the outside of the connector tongue 8 after the locking latch 22 has snapped into the locking latch reception 11. Due to the prestress provided through the latching arms 14, 14' and transmitted onto the press-on section 13, the backside of the connector tongue 8—the contact face 23 of the connection section 7—is pressed onto the contact face 6 of the connection section 2 of the cable duct 1. Consequently both contact faces 6, 23 are under a press-on force predefined through the prestress of the latching arms 14, 14'. The area of the contact faces 6, 23 in contact with one another and the defined press-on force with which the two contact faces 6, 23 are in contact on one another permits the formation of a defined electrical connection of the two cable ducts 1, 4, such that this connection meets electrical requirements. The mechanical fixing of the two cable ducts 1, 4 with respect to one another takes place through the dimensioning of the latching arms 14, 14' and the breakthroughs 5, 5'. Usefully the height of the breakthroughs 5, 5' is dimensioned only minimally greater than the height of the latching arms 14, 14'. The longitudinal extent of the locking latch 22 corresponds substantially to the longitudinal extent of the locking latch reception 11, such that the two cable ducts 1, 4 with their particular connection sections 2, 7 are connected with one another with minimal or no play through the connection element 12.

FIG. 5 depicts two cable ducts 24, 25 connected with one another which are in principle connected in the same manner as has been explained in connection with the previously described embodiment example of FIGS. 1 to 4. In contrast to the embodiment example of FIGS. 1 and 4, where the two cable ducts 1, 4 are connected by a vertical joining movement, the joining together of the cable ducts 24, 25 is carried out by a horizontal joining movement. For these reasons connection elements 12 pre-mounted on the cable duct 24, are rotated by 90 E with respect to the FIG. 4 disposition on the cable duct 1 and are disposed with their latching extension 20 toward the cable duct 25. In the depicted embodiment example two superjacent connection elements 12 are provided due to the wall height of the cable ducts 24, 25. The connection section 26, of the cable duct 25 is formed in the manner of a sleeve and has two connector tongues 27, 28. The connector tongues have been slid under the press-on section of the connection elements 12 in the process of joining the two cable ducts 24, 25, and are subsequently with their insides in contact on the outside of the connection section of the cable duct 24.

The description of the invention makes clear that, through the described disposition, the two cable support device elements to be connected can be equipped with elements that have a simple construction, which are required for the connection of the two cable support device elements utilizing the above described connection elements. The connection is possible in simple manner that is free of tools. The connection element(s)—as described—is(are) usefully already pre-mounted on a connection section of a cable support device element. Nevertheless, mounting the connection elements is also possible in situ during the formation of the cable support system. An identical connection of two cable support device elements in particular takes place independently of their material or also their material thickness. For different material thicknesses, differently dimensioned connection elements can be provided. The connection elements themselves have, moreover, a suitable site for the application of an identification due to the planar formation of their press-on section. Since the two cable support device elements can only be assembled according to a single joining movement, faulty mounting is avoided.

These explanations describe an embodiment example. Nevertheless, the claimed protection extends also to numerous other implementations which have not been explicitly described in these documents.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true sprit and scope. Each apparatus embodiment described herein has numerous equivalents.

LIST OF REFERENCE NUMBERS

1 Cable duct
2 Connection section
3 Wall
4 Cable duct
5, 5' Breakthrough
6 Contact face
7 Connection section
8 Connector tongue
9 Margin
10 Insection
11 Locking latch reception
12 Connection element
13 Press-on section
14, 14' Latching arm
15 Arc segment
16 Connection limb
17 Hook element
18 Free end 19 Plane
20 Latching extension
21 Run-up ramp
22 Locking latch
23 Contact face
24 Cable duct
25 Cable duct
26 Connection section
27 Connector tongue
28 Connector tongue

The invention claimed is:

1. A cable support system having at least two cable support device elements, a first cable support device element and a second cable support device element, that can be mechanically connected in an electrically conducting manner, each of said cable support device elements having a connection section, said connection sections disposed such that they overlap, said cable support system comprising:
  at least one connection element connecting said cable support device elements, wherein the connection element comprises a press-on section and two latching arms extending from different sides with respect to the press-on section;
  each of said latching arms having a connection limb extending in a transverse direction to the extent of the press-on section and having a hook element disposed at each of a free end of the connection limb;
  the connection element being mounted under spring prestress for retaining together said cable support device elements;
  said press-on section being on a surface of the connection section of said first cable support device element and with said hook elements extending behind the connection section of said second cable support device element on an opposite surface of the connection section of said second cable support device element;
  said connection section of said first cable support device element further comprises at a first electrical contact face in contact with a second electrical contact face of said connection section of said second cable support device element, the connection of the first and second electrical contact faces forming a defined electrical connection of said first and second cable support device elements;
  the first electrical contact face being delimited on two sides by breakthroughs extending through the connection section of said first cable support device element;
  said latching arms and connection limbs configured to extend through both of the connection sections of said first and second cable support device elements bearing the electrical contact faces on each of said cable support device elements, and
  at least one of said latching arms has spring-elastic material properties in at least a portion of the at least one latching arm, whereby the electrical contact faces are in contact with one another under a defined press-on force.

2. The cable support system as claimed in claim 1, wherein:
  each of said cable support device elements further comprises a complementary connection section, each of said complementary connection sections having one of said electrical contact faces, wherein a first of said electrical contact faces of a first of said complementary connection section is formed said two breakthroughs spaced apart from one another;
  each of said breakthroughs having a height corresponding substantially to a height of said connection limbs of said latching arm;
  a distance of an outer delimitation of said breakthroughs from one another is less than a distance of a termination of said hook elements of said complementary connection element from one another; and
  wherein a second of said complementary connection section having the second of said electrical contact faces, said electrical contact face being a third marginally open breakthrough and an edge of the second complementary connection section forming a blade terminal element.

3. The cable support system as claimed in claim 2, further comprising a locking latch on said second complementary connection section which is an outer of the two cable support device elements when connected.

4. The cable support system as claimed claim 2, wherein each of said hook elements project from each of said connection limbs respectively such that the hook elements are directed in opposite directions.

5. The cable support system as claimed in claim 4, wherein one of said hook elements is disposed on one of said connection limbs and the other of said hook elements disposed on the other of said connection limbs such that the hook elements are directed away from one another.

6. The cable support system as claimed in claim 2, wherein at least one of said connection arms is formed in the shape of an "S".

7. The cable support system as claimed in claim 6, wherein at least one of said connection elements further comprises an additional latching extension with an inwardly projecting locking latch.

8. The cable support system as claimed in claim 7, wherein a free end of the latching extension projecting outwardly forms a run-up ramp.

9. The cable support system as claimed in claim 1, wherein said latching arms are disposed on opposite sides of said press-on section.

10. A connection element to for establish a mechanical connection between two cable support device elements, a first cable support device element and a second cable support device element, each of said cable support device elements having a connection section bearing a first and second electrical contact faces respectively, said connection section of said first cable support device element overlapping said connection section of said second cable support device element and forming a cable support system, wherein the connection element comprises:
  a press-on section and two latching arms extending from different sides of the press-on section, each of said latching arms having a connection limb extending in a transverse direction to the press-on section;
  a hook element disposed on a free end of each of the connection limbs wherein the latching arms and the connection limbs are formed to extend through said first electrical contact face of said first cable support device element when said press-on section is placed against said first electrical contact face of said first cable support device element to form a defined electrical connection with said second electrical contact face of said second cable support device element, and
  wherein at least one of said latching arms has spring-elastic material properties in at least a section, whereby the first and second electrical contact faces are in contact on one another with defined press-on force.

11. The connection element as claimed in claim 10, wherein one of said hook elements project from one of said connection limbs and the other of said hook elements disposed on the other of said connection limbs such that they are directed in opposite directions.

12. The connection element as claimed in claim 11, wherein one of said hook elements is disposed on one of said connection limbs and the other of said hook elements disposed on the other of said connection limbs such that they are directed away from one another.

13. The connection element as claimed in claim 11, wherein at least one of said connection arms is formed in the shape of an "S".

14. The connection element as claimed in claim 13, wherein the connection element further comprises an additional latching extension with an inwardly projecting locking latch.

15. The connection element as claimed in claim 14, wherein a free end of the latching extension projecting outwardly forming a run-up ramp.

16. The connection element as claimed in claim 10, wherein the latching arms are disposed on opposite sides of the press-on section.

17. The connection element as claimed in claim 10, wherein the connection element is premounted on one of said cable support device elements.

* * * * *